US010801854B2

(12) United States Patent
Chiu

(10) Patent No.: US 10,801,854 B2
(45) Date of Patent: Oct. 13, 2020

(54) NAVIGATION SYSTEM FOR THE VISUALLY IMPAIRED AND METHOD THEREOF

(71) Applicants: Inventec (Pudong) Technology Corporation, Shanghai (CN); Inventec Corporation, Taipei (TW)

(72) Inventor: Chaucer Chiu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 274 days.

(21) Appl. No.: 16/009,954

(22) Filed: Jun. 15, 2018

(65) Prior Publication Data

US 2019/0170532 A1    Jun. 6, 2019

(30) Foreign Application Priority Data

Dec. 6, 2017  (CN) .......................... 2017 1 1273789

(51) Int. Cl.
*G01C 21/00* (2006.01)
*G01C 21/36* (2006.01)
(Continued)

(52) U.S. Cl.
CPC ..... *G01C 21/3629* (2013.01); *G01C 21/3679* (2013.01); *G01C 21/3691* (2013.01);
(Continued)

(58) Field of Classification Search
None
See application file for complete search history.

(56) References Cited

U.S. PATENT DOCUMENTS

2004/0143387 A1* 7/2004 Shimizu .......... G08G 1/096844
701/414
2006/0293839 A1* 12/2006 Stankieiwcz .......... G01C 21/20
701/434
(Continued)

*Primary Examiner* — Truc M Do
(74) *Attorney, Agent, or Firm* — David R. Stevens; Stevens Law Group

(57) ABSTRACT

A navigation method for the visually impaired includes the following steps. After obtaining construction information and/or real-time traffic information, a server can transmit the construction information and/or real-time traffic information according to a geographical location. Each traffic condition information transmission device can receive the construction information and/or the real-time traffic information corresponding to a location thereof and forward the construction information and/or the real-time traffic information. A mobile device can modify a navigation route after receiving the construction information and/or the real-time traffic information transmitted from any traffic information transmission device on the navigation route, and the mobile device can convert the construction information and/or the real-time traffic information into a speech message and convert the modified navigation route into a real-time speech guiding message. Thus, the mobile device can perform navigation effectively to avoid the road section under construction or the road section with abnormal traffic condition.

6 Claims, 2 Drawing Sheets

(51) Int. Cl.
  *H04W 60/00*  (2009.01)
  *G01S 19/13*  (2010.01)
  *A61H 3/06*  (2006.01)
  *G01C 21/34*  (2006.01)

(52) U.S. Cl.
  CPC ............ *G01S 19/13* (2013.01); *H04W 60/00* (2013.01); *A61H 3/061* (2013.01); *G01C 21/3415* (2013.01)

(56) References Cited

U.S. PATENT DOCUMENTS

| | | | |
|---|---|---|---|
| 2012/0062357 A1* | 3/2012 | Slamka | G09B 21/006 |
| | | | 340/4.11 |
| 2015/0066271 A1* | 3/2015 | Ogawa | B60L 15/2009 |
| | | | 701/22 |
| 2015/0230056 A1* | 8/2015 | Shin | H04L 12/12 |
| | | | 455/420 |
| 2016/0063893 A1* | 3/2016 | Kanuganti | H04M 1/72588 |
| | | | 348/62 |
| 2016/0116292 A1* | 4/2016 | An | G01C 21/3682 |
| | | | 701/454 |
| 2016/0116299 A1* | 4/2016 | Kim | G01C 21/3617 |
| | | | 701/438 |
| 2016/0216130 A1* | 7/2016 | Abramson | G01C 21/3423 |
| 2016/0349066 A1* | 12/2016 | Chung | B60K 35/00 |
| 2017/0038775 A1* | 2/2017 | Park | F02D 41/0007 |
| 2018/0128622 A1* | 5/2018 | Alataas | G01C 21/005 |
| 2018/0356233 A1* | 12/2018 | Baqain | A61H 3/02 |

* cited by examiner

NAVIGATION SYSTEM FOR THE VISUALLY IMPAIRED AND METHOD THEREOF

CROSS-REFERENCE TO RELATED APPLICATION

This application claims the benefit of Chinese Patent Application No. 201711273789.8, filed Dec. 6, 2017.

BACKGROUND OF THE INVENTION

Field of the Invention

The present invention relates to a navigation system and a method thereof, more particularly a navigation system for the visually impaired and a method thereof.

Description of the Related Art

In recent years, road lamps have been used for the construction of roads, so that the road lamps can cover a wide range of areas. However, existing road lamps only have the effect of lighting and have no other functions. Therefore, how to apply the road lamps to create greater benefits to people's lives is a great issue to be solved.

SUMMARY OF THE INVENTION

Therefore, the present invention provides a navigation system for the visually impaired, and a method thereof, so as to apply the road lamps to create greater benefits.

According to an embodiment, the present invention provides a navigation system for the visually impaired, and the navigation system includes a server, a plurality of traffic condition information transmission devices, and at least one mobile device. The server includes an acquisition module, a processing module and a transmission module. The acquisition module is configured to acquire construction information through a network service and/or acquire real-time traffic condition information through a traffic broadcasting service. The processing module is configured to classify the construction information and/or the real-time traffic condition information according to a geographic location corresponding to the construction information and/or the real-time traffic condition information. The transmission module is configured to transmit the construction information and/or the real-time traffic condition information according to the geographic location corresponding to the construction information and/or the real-time traffic condition information.

Each traffic condition information transmission device is disposed on a road lamp, and configured to receive the construction information and/or the real-time traffic condition information corresponding to a location thereof and forward the received construction information and/or the real-time traffic condition information.

The at least one mobile device includes a navigation module, a receiving module and a speech module. The navigation module is configured to plan a navigation route according to a requirement of the visually impaired. The receiving module is linked to at least one of the plurality of traffic condition information transmission devices on the navigation route, and configured to receive the construction information and/or the real-time traffic condition information transmitted from the linked traffic condition information transmission device, so that the navigation module modifies the navigation route according to the construction information and/or the real-time traffic condition information received by the receiving module. The speech module is configured to convert the construction information and/or the real-time traffic condition information into speech information for the visually impaired, and convert the modified navigation route into a real-time speech guiding message for the visually impaired.

According to an embodiment, the present invention provides a navigation method for the visually impaired, and the navigation method includes steps of: providing a server, a plurality of traffic condition information transmission devices and at least one mobile device, wherein the server comprises an acquisition module, a processing module and a transmission module, and each traffic condition information transmission device is disposed correspondingly to a road lamp; the at least one mobile device comprises a receiving module, a navigation module and a speech module; acquiring, by the acquisition module, construction information through a network service and/or real-time traffic condition information through a traffic broadcasting service; classifying, by the processing module, the construction information and/or the real-time traffic condition information according to a geographic location corresponding to the construction information and/or the real-time traffic condition information, and transmitting, by the transmission module, the construction information and the real-time traffic condition information according to the geographic location corresponding to the construction information and the real-time traffic condition information; receiving, by each of the plurality of traffic condition information transmission devices, the construction information and/or the real-time traffic condition information corresponding to a location thereof, and forwarding the received construction information and/or the received real-time traffic condition information; planning, by the navigation module of the at least one mobile device, a navigation route according to a requirement of the visually impaired; linking the receiving module of the at least one mobile device to at least one of the plurality of traffic condition information transmission devices located on the navigation route, and receiving, by the receiving module of the at least one mobile device, the construction information and/or the real-time traffic condition information transmitted from the linked traffic condition information transmission device, so as to make the navigation module modify the navigation route according to the construction information and/or the real-time traffic condition information received by the receiving module; and converting, by the speech module, the construction information and/or the real-time traffic condition information into speech information for the visually impaired, and converting, by the speech module, the modified navigation route into a real-time speech guiding message for the visually impaired.

According to above contents, the difference between conventional technology and the technology of the present invention is that, the system and method of the present invention use the server to acquire the construction information and/or real-time traffic condition information, and transmit the construction information and/or the real-time traffic condition information according to the geographic location of the construction information and/or the real-time traffic condition information, and use each traffic condition information transmission device to receive the construction information and/or the real-time traffic condition information corresponding to the location thereof, and forward the received construction information and/or real-time traffic condition information; and use the mobile device to receive the construction information and/or real-time traffic condition information transmitted from at least one traffic condition information transmission device located on the navigation route, and then modify the navigation route and convert the construction information and/or the real-time traffic condition information into the speech information and convert the modified navigation route into the real-time speech guiding message.

As a result, aforementioned technical solution can enable the mobile device to perform navigation effectively to avoid the road section under construction or the road section with abnormal traffic condition.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
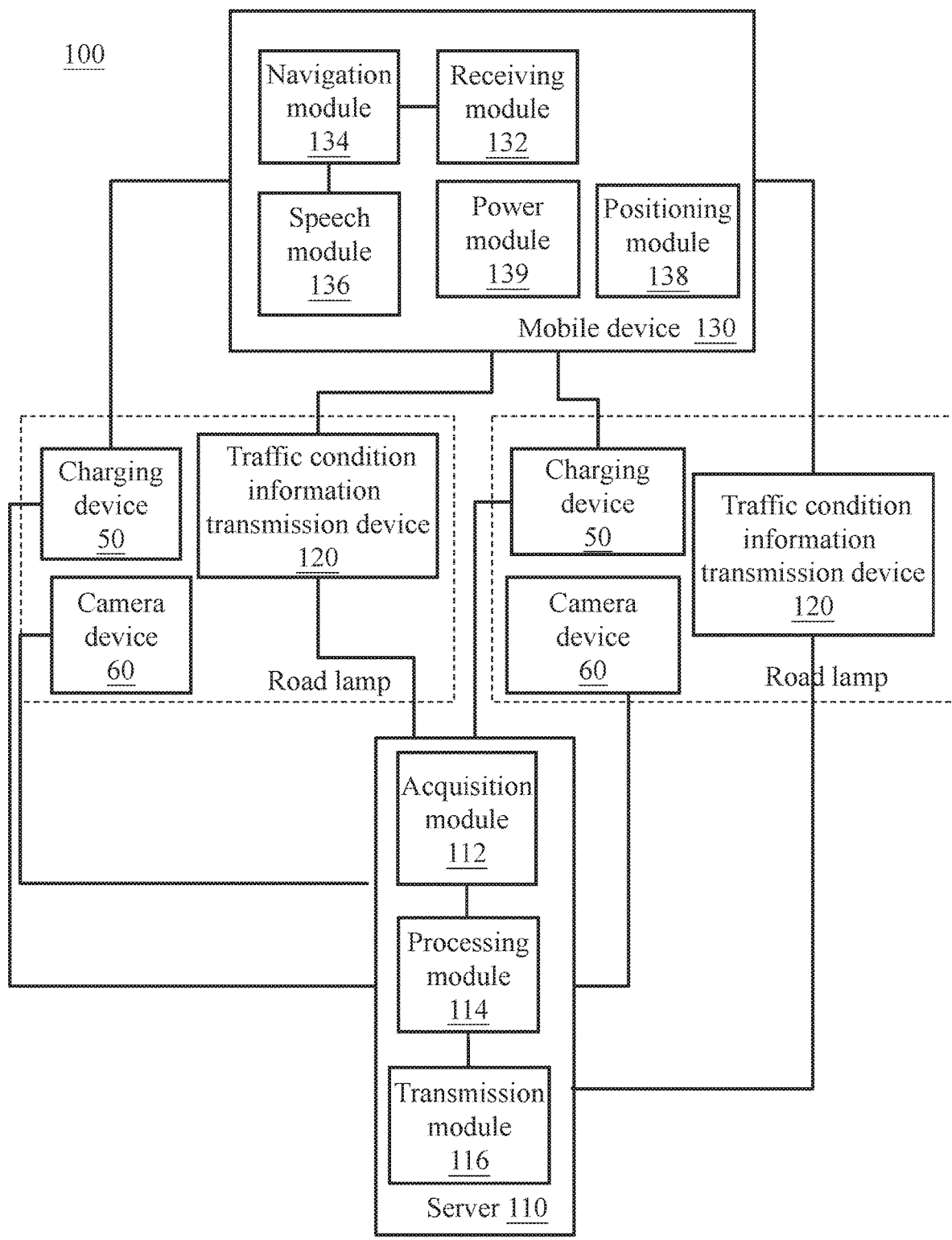
FIG. 1 is a system block diagram of an embodiment of a navigation system for the visually impaired, according to the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

The nouns defined in the present invention are described before the illustration of a navigation system for the visually impaired and a method thereof of the present invention, the server, the mobile device and the traffic condition information transmission device of the navigation system for the visually impaired of the present invention can be implemented by various manners including software, hardware, firmware or any combination thereof. In an embodiment, the software or firmware used for the navigation system for the visually impaired can be stored in machine-readable storage medium, such as ROM memory, RAM memory, magnetic disk storage medium, optical storage medium, flash memory device, and so on, and can be performed by at least one general-purpose programmable microprocessor or dedicated programmable microprocessor. The server, the mobile device and the traffic condition information transmission device included in the navigation system of the present invention can be in communication with each other through a network, such as a mobile communication network, an internet network, a local area network, a Wide Area Network, a wireless network, or a combination thereof.

The navigation system for the visually impaired and the method thereof of the present invention will hereinafter be described in more detail with reference to the accompanying drawings. Please refer to FIG. 1, which is a system block diagram of an embodiment of a navigation system for the visually impaired, according to the present invention. The navigation system 100 comprises a server 110, a plurality of traffic condition information transmission devices 120 and at least one mobile device 130. For the convenience of representation, only two traffic condition information transmission devices 120 and one mobile device 130 are presented in FIG. 1 for description of embodiment; however, in actual application, the numbers of the traffic condition information transmission device 120 and the mobile device 130 can be adjusted according to requirement.

In this embodiment, the server 110 comprises an acquisition module 112, a processing module 114 and a transmission module 116. The processing module 114 is electrically connected to the acquisition module 112 and transmission module 116. The acquisition module 112 of the server 110 is configured to acquire construction information through a network service and/or acquire real-time traffic condition information through a traffic broadcasting service. In an embodiment, the construction information can be, but not limited to, the construction information published by a government department, and the content of the construction information can include, but not limited to, information about road excavation, asphalt pavement repair or pipeline excavation. The real-time traffic condition information can be, but not limited to, real-time abnormal traffic condition (such as traffic jam or car accident) provided by a radio station. Each of the construction information and real-time traffic condition information can comprise event data, location data and time data.

Each of the construction information and real-time traffic condition information comprises the event data, the location data and the time data, so the processing module 114 of the server 110 can classify the construction information and/or real-time traffic condition information acquired by the acquisition module 112, according to geographic locations (that is, location data) corresponding to construction information and/or the real-time traffic condition information, and the transmission module 116 of the server 110 can transmit the construction information and/or real-time traffic condition information; according to the geographic location corresponding to the construction information and/or real-time traffic condition information.

Each traffic condition information transmission device 120 is disposed correspondingly to a road lamp, and configured to receive the construction information and/or the real-time traffic condition information corresponding to a location thereof, and forward the received construction information and/or real-time traffic condition information to the mobile device 130 linked thereto; in other words, each traffic condition information transmission device 120 can receive the construction information and/or the real-time traffic condition information associated with the location thereof and forward the received construction information and/or the real-time traffic condition information to the mobile device 130 linked thereto. The construction information and/or the real-time traffic condition information received by each traffic condition information transmission device 120 corresponding to a location thereof is the construction information and/or the real-time traffic condition information transmitted by the transmission module 116 of the server 110 according to the geographic location corresponding to the construction information and/or real-time traffic condition information.

The mobile device 130 comprises a receiving module 132, a navigation module 134 and a speech module 136. The navigation module 134 is configured to plan a navigation route according to a requirement of the visually impaired, and the receiving module 132 is linked to at least one of the traffic condition information transmission device 120 on the navigation route, and configured to receive the construction information and/or the real-time traffic condition information transmitted from the traffic condition information transmission device 120 linked thereto, so that the navigation module 134 can modify the navigation route according to the construction information and/or the real-time traffic condition information received by the receiving module 132. The speech module 136 of the mobile device 130 is configured to convert the construction information and/or the real-time traffic condition information into speech information for the visually impaired, and convert the modified navigation route into a real-time speech guiding message for the visually impaired. In other words, when the server 110 determines that a construction site (that is, the location data of the construction information) or a road section with abnormal traffic condition (that is, the location data of the real-time traffic condition information) is located on the navigation route planned according to the requirement of the visually impaired, the navigation route can be modified immediately and anytime to avoid the road section under construction or the road section with abnormal traffic condition, so that the visually impaired can move safely without passing the dangerous road section.

In this embodiment, in order to prevent the mobile device 130 from having insufficient power for normal operation, the navigation system for the visually impaired 100 can further comprise a plurality of charging devices 50 disposed correspondingly one-to-one to the plurality of road lamps. The mobile device 130 can further comprise a positioning module 138 and a power module 139. The power module 139 is configured to determine whether the mobile device 130 has sufficient power for normal operation, and the positioning module 138 is configured to provide a position signal of the mobile device 130. When the power module 139 determines the mobile device 130 has insufficient power for normal operation, the power module 139 transmits a charging signal to the server 110. The server 110 can store address data or location data of all road lamp, that is, the server 110 knows the address or the location of each road lamp, so the processing module 114 can determine, according to the position signal of the mobile device 130, whether any charging device 50 is located around the mobile device 130, and when the processing module 114 determines that there is at least one charging device 50 located around the mobile device 130, the processing module 114 can control the charging device 50 located around the mobile device 130 to transmit the power signal to the power module 139 of the mobile device 130. The positioning module 138 can provide the position signal of the mobile device 130 through GPS satellite positioning manner, base station positioning manner, or Wi-Fi positioning manner. As a result, the charging device 50 disposed on the road lamp can provide electrical power to the mobile device 130 having insufficient power.

Furthermore, in the embodiment, the navigation system 100 for the visually impaired can further comprise a plurality of camera devices 60 disposed correspondingly at least one-to-one to the plurality of road lamps. Each camera device 60 can capture a traffic image in real time and transmit the captured traffic image and an identification mark of the road lamp corresponding thereto (that is, the address or the location data of the road lamp where the camera device 60 is disposed), to the server 110. The acquisition module 112 can analyze the traffic images transmitted from the camera devices 60, to obtain the abnormal environment information. According to the identification mark of the road lamp transmitted from the camera device 60 corresponding to the abnormal environment information, the transmission module 116 can transmit the abnormal environment information to the corresponding traffic condition information transmission device 120; and, the traffic condition information transmission device 120 receiving the abnormal environment information can forward the abnormal environment information to the mobile device 130 linked thereto, so that the navigation module 134 can modify the navigation route according to the abnormal environment information. In greater detail, the acquisition module 112 can analyze the traffic images captured by the camera devices 60, to determine whether the environment condition around the road lamp where the camera device 60 is disposed, is abnormal; and, after the acquisition module 112 analyzes the traffic images and determines that the environment condition corresponding to one of the traffic images is abnormal, the acquisition module 112 obtains the abnormal environment information; and, according to the identification mark of the road lamp corresponding to the traffic image by which the abnormal environment condition is determined (that is, the location of the camera device 60 capturing the traffic image corresponding to the abnormal environment condition, or the location of the road lamp where this camera device 60 is disposed), the transmission module 116 transmits the abnormal environment information to the traffic condition information transmission device 120 corresponding to the abnormal environment information; and, when the traffic condition information transmission device 120 receiving the abnormal environment information is located on the navigation route planned by the navigation module 134, the traffic condition information transmission device 120 receiving the abnormal environment information can forward the abnormal environment information to the mobile device 130 linked thereto, so that the navigation module 134 can modify the navigation route according to the abnormal environment information, to avoid the road section under abnormal environmental condition, and the visually impaired can move along the navigation route safely. The abnormal environmental condition determined by the acquisition module 112 can be, but not limited to, fire or house collapse, and the abnormal environmental condition can be used to determine potentially dangerous condition other than the construction information and real-time traffic condition information, thereby planning the navigation route avoiding the road section under abnormal environmental condition.

Figure 2:
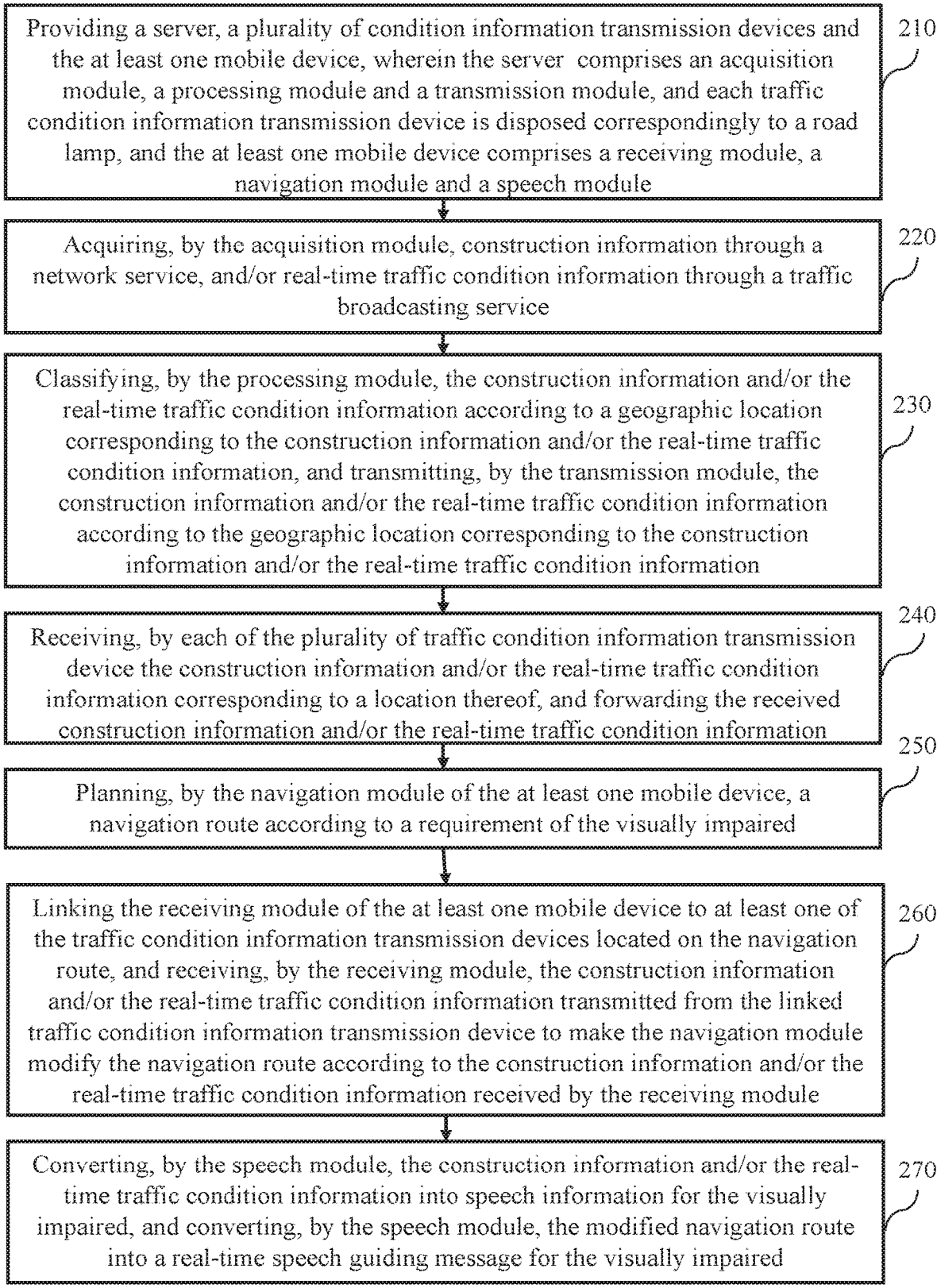
FIG. 2 is a flow chart of an operation of a navigation method for the visually impaired performed by the navigation system f of FIG. 1, according to an embodiment of the present invention.

Please refer to FIG. 2, which is a flow chart of an operation of a navigation method for the visually impaired performed by the navigation system of FIG. 1, according to an embodiment of the present invention. The method includes steps 210 to 270. In the step 210, the server, the plurality of condition information transmission devices and the at least one mobile device are provided. The server comprises the acquisition module, the processing module and the transmission module, and each traffic condition information transmission device is disposed correspondingly to a road lamp, and the at least one mobile device comprises the receiving module, the navigation module and the speech module. In the step 220, the acquisition module acquires the construction information through a network service, and/or the real-time traffic condition information through a traffic broadcasting service. In the step 230, the processing module classifies the construction information and/or the real-time traffic condition information, according to a geographic location corresponding to the construction information and/or the real-time traffic condition information, and the transmission module transmits the construction information and the real-time traffic condition information according to the geographic location corresponding to the construction information and the real-time traffic condition information. In the step 240, each of the plurality of traffic condition information transmission devices receives the construction information and/or the real-time traffic condition information corresponding to a location thereof, and forwards the received construction information and/or the real-time traffic condition information. In the step 250, the navigation module of the at least one mobile device plans the navigation route according to a requirement of a visually impaired. In the step 260, the receiving module of the at least one mobile device is linked to at least one of the plurality of traffic condition information transmission devices located on the navigation route, and receives the construction information and/or the real-time traffic condition information transmitted from the linked traffic condition information transmission device, so that the navigation module can modify the navigation route according to the construction information and/or the real-time traffic condition information received by the receiving module. In the step 270, the speech module converts the construction information and/or the real-time traffic condition information into speech information for the visually impaired, and converts the modified navigation route into a real-time speech guiding message for the visually impaired.

Through aforementioned steps, the server can acquire the construction information and/or real-time traffic condition information, and transmit the construction information and/or the real-time traffic condition information according to the geographic location corresponding to the construction information and/or the real-time traffic condition information; and each traffic condition information transmission device can receive the construction information and/or the real-time traffic condition information corresponding to a location thereof, and forward the construction information and/or real-time traffic condition information; and after the mobile device receives the construction information and/or real-time traffic condition information transmitted from any traffic condition information transmission device located on the navigation route, the mobile device can modify the navigation route and convert the construction information and/or the real-time traffic condition information into the speech information and convert the modified navigation route into the real-time speech guiding message, so that the mobile device can perform navigation for the visually impaired effectively to avoid the road section under construction or the road section with abnormal traffic condition.

In other embodiment, in order to prevent the mobile device from having insufficient power for normal operation, the navigation method for the visually impaired can include steps of: providing a plurality of charging devices disposed correspondingly one-to-one to the plurality of road lamps; determining, by a power module of the at least one mobile device, whether the at least one mobile device has sufficient power; providing, by a positioning module of the at least one mobile device, a position signal of the at least one mobile device to the server; transmitting, by the power module, a charging signal to the server when the power module determines that the at least one mobile device has insufficient power; determining, by the processing module according to the position signal of the at least one mobile device, whether one of the plurality of charging devices is located around the at least one mobile device; and controlling, by the processing module, the charging device located around the at least one mobile device to transmit a power signal to the power module of the at least one mobile device when the processing module determines that there is at least one of the plurality of charging device located around the at least one mobile device. As a result, the charging devices disposed on the road lamps can provide electrical power to the mobile device having insufficient power.

In an embodiment, the step of providing, by the positioning module of the at least one mobile device, the position signal of the at least one mobile device to the server, can comprises a step of providing the position signal of the at least one mobile device by GPS satellite positioning manner, base station positioning manner or Wi-Fi positioning manner; to the server. The detailed description is described in above paragraphs, and not repeated herein.

In an embodiment, the navigation method for the visually impaired can further include steps of: providing a plurality of camera devices disposed correspondingly at least one-to-one to the plurality of road lamps; capturing, by each of the plurality of camera devices, a traffic image in real time and transmitting the traffic image and an identification mark of the road lamp corresponding thereto to the server; analyzing; by the acquisition module, the traffic images transmitted from the plurality of camera devices, to obtain abnormal environment information; transmitting, by the transmission module, the abnormal environment information according to the identification mark of the road lamp transmitted from the camera device corresponding to the abnormal environment information; and forwarding, by the traffic condition information transmission device receiving the abnormal environment information, the abnormal environment information to the at least one mobile device linked thereto, to make the navigation module modify the navigation route according to the abnormal environment information. As a result, the navigation module can modify the navigation route according to the abnormal environment information, to avoid the road section under abnormal environmental condition, so that the visually impaired can move along the navigation route safely. The detailed descriptions are described in above paragraphs, and not repeated herein.

It should be noted that the steps of the navigation method for the visually impaired can be performed by any sequential order, unless the cause-effect relation specifically indicated.

In summary, the difference between the conventional technology and the technology of the present invention is that the system and the method of the present invention can use the server to acquire the construction information and/or real-time traffic condition information, and transmit the construction information and/or the real-time traffic condition information according to the geographic location corresponding to the construction information and/or the real-time traffic condition information, and use each traffic condition information transmission device to receive, according to the location thereof, the construction information and/or the real-time traffic condition information, and forward the construction information and/or real-time traffic condition information; and after the mobile device receives the construction information and/or real-time traffic condition information transmitted from any traffic condition information transmission device located on the navigation route; the mobile device can modify the navigation route and convert the construction information and/or the real-time traffic condition information into the speech information and convert the modified navigation route into the real-time speech guiding message, so that the mobile device can perform navigation for the visually impaired effectively to avoid the road section under construction or the road section with abnormal traffic condition.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A navigation system for the visually impaired, comprising:
    a server comprising:
        an acquisition module configured to acquire construction information through a network service and/or acquire real-time traffic condition information through a traffic broadcasting service;
        a processing module configured to classify the construction information and/or the real-time traffic condition information according to a geographic location corresponding to the construction information and/or the real-time traffic condition information; and
        a transmission module configured to transmit the construction information and/or the real-time traffic condition information according to the geographic location corresponding to the construction information and/or the real-time traffic condition information;
    a plurality of traffic condition information transmission devices, wherein each of the plurality of traffic condition information transmission devices is disposed correspondingly to a road lamp having a charging device, and configured to receive the construction information and/or the real-time traffic condition information corresponding to a location thereof, and forward the received construction information and/or the real-time traffic condition information; and
    at least one mobile device comprising:
        a power module configured to determine whether the at least one mobile device has sufficient power;
        a positioning module configured to provide a position signal of the at least one mobile device;
        a navigation module configured to plan a navigation route according to a requirement of the visually impaired;
        a receiving module linked to at least one of the plurality of traffic condition information transmission devices on the navigation route, and configured to receive the construction information and/or the real-time traffic condition information transmitted from the linked traffic condition information transmission device, so that the navigation module modifies the navigation route according to the construction information and/or the real-time traffic condition information received by the receiving module; and
        a speech module configured to convert the construction information and/or the real-time traffic condition information into speech information for the visually impaired, and convert the modified navigation route into a real-time speech guiding message for the visually impaired,
    wherein when the power module determines the at least one mobile device has insufficient power, the power module transmits a charging signal to the server, and the processing module determines, according to the position signal of the at least one mobile device, whether any charging device is located around the at least one mobile device; and when the processing module determines that there is at least one of the plurality of charging devices located around the at least one mobile device, the processing module controls the charging device located around the at least one mobile device to transmit a power signal to the power module of the at least one mobile device.

2. The navigation system according to claim 1, wherein the positioning module provides the position signal of the at least one mobile device by using GPS satellite positioning manner, base station positioning manner or Wi-Fi positioning manner.

3. The navigation system according to claim 1, further comprising a plurality of camera devices disposed correspondingly at least one-to-one to the plurality of road lamps, wherein each of the plurality of camera devices is configured to capture a traffic image in real time, and transmit the traffic image and an identification mark of the road lamp corresponding thereto, to the server, and the acquisition module analyzes the traffic images transmitted from the plurality of camera devices to obtain abnormal environment information, and according to the identification mark of the road lamp transmitted from the camera device corresponding to the abnormal environment information, the transmission module transmits the abnormal environment information, and the traffic condition information transmission device receiving the abnormal environment information forwards the abnormal environment information to the at least one mobile device linked thereto, so that the navigation module modifies the navigation route according to the abnormal environment information.

4. A navigation method for the visually impaired, comprising, providing a server, a plurality of traffic condition information transmission devices and at least one mobile device, wherein the server comprises an acquisition module, a processing module and a transmission module, and each of the plurality of traffic condition information transmission devices is disposed correspondingly to a road lamp having a charging device, and the at least one mobile device comprises a receiving module, a navigation module and a speech module;

acquiring, by the acquisition module, construction information through a network service and/or real-time traffic condition information through a traffic broadcasting service;

classifying, by the processing module, the construction information and/or the real-time traffic condition information according to a geographic location corresponding to the construction information and/or the real-time traffic condition information, and transmitting, by the transmission module, the construction information and the real-time traffic condition information according to the geographic location corresponding to the construction information and the real-time traffic condition information;

receiving, by each of the plurality of traffic condition information transmission devices, the construction information and/or the real-time traffic condition information corresponding to a location thereof, and forwarding the received construction information and/or the received real-time traffic condition information;

planning, by the navigation module of the at least one mobile device, a navigation route according to a requirement of the visually impaired;

linking the receiving module of the at least one mobile device to at least one of the plurality of traffic condition information transmission devices located on the navigation route, and receiving, by the receiving module of the at least one mobile device, the construction information and/or the real-time traffic condition information transmitted from the linked traffic condition information transmission device, so as to make the navigation module modify the navigation route according to the construction information and/or the real-time traffic condition information received by the receiving module;

converting, by the speech module, the construction information and/or the real-time traffic condition information into speech information for the visually impaired, and converting, by the speech module, the modified navigation route into a real-time speech guiding message for the visually impaired;

determining, by a power module of the at least one mobile device, whether the at least one mobile device has sufficient power;

providing, by a positioning module of the at least one mobile device, a position signal of the at least one mobile device to the server;

transmitting, by the power module, a charging signal to the server when the power module determines that the at least one mobile device has insufficient power;

determining, by the processing module according to the position signal of the at least one mobile device, whether one of the plurality of charging devices is located around the at least one mobile device; and controlling, by the processing module, the charging device located around the at least one mobile device to transmit a power signal to the power module of the at least one mobile device when the processing module determines that there is at least one of the plurality of charging device located around the at least one mobile device.

5. The navigation method according to claim 4, wherein the step of providing, by the positioning module of the at least one mobile device, the position signal of the at least one mobile device to the server, comprises:

providing the position signal of the at least one mobile device to the server by the positioning module using GPS satellite positioning manner, base station positioning manner or Wi-Fi positioning manner.

6. The navigation method according to claim 4, further comprising:

providing a plurality of camera devices disposed correspondingly at least one-to-one to the plurality of road lamps;

capturing, by each of the plurality of camera devices, a traffic image in real time and transmitting the traffic image and an identification mark of the road lamp corresponding thereto to the server;

analyzing, by the acquisition module, the traffic images transmitted from the plurality of camera devices, to obtain abnormal environment information;

transmitting, by the transmission module, the abnormal environment information according to the identification mark of the road lamp transmitted from the camera device corresponding to the abnormal environment information; and forwarding, by the traffic condition information transmission device receiving the abnormal environment information, the abnormal environment information to the at least one mobile device linked thereto, to make the navigation module modify the navigation route according to the abnormal environment information.

* * * * *